United States Patent
Schatzmayr

(10) Patent No.: US 8,712,454 B2
(45) Date of Patent: Apr. 29, 2014

(54) METHOD FOR TRANSMITTING AN ELECTRONIC SHORT MESSAGE TO MULTIPLE RECEIVERS

(75) Inventor: Rainer Schatzmayr, Bonn (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 13/266,352

(22) PCT Filed: Jun. 23, 2010

(86) PCT No.: PCT/EP2010/003765
§ 371 (c)(1),
(2), (4) Date: Nov. 15, 2011

(87) PCT Pub. No.: WO2010/149348
PCT Pub. Date: Dec. 29, 2010

(65) Prior Publication Data
US 2012/0058786 A1    Mar. 8, 2012

(30) Foreign Application Priority Data
Jun. 23, 2009   (DE) .......................... 10 2009 030 219

(51) Int. Cl.
*H04W 4/00*    (2009.01)

(52) U.S. Cl.
USPC ..... 455/466; 455/403; 455/435.1; 455/422.1; 370/328; 370/349

(58) Field of Classification Search
USPC ............... 455/466, 403, 435.1, 422.1, 518; 370/328, 349
See application file for complete search history.

(56) References Cited

U.S. PATENT DOCUMENTS

| | | | |
|---|---|---|---|
| 7,544,634 B2 | 6/2009 | Echigo et al. | |
| 2004/0022264 A1* | 2/2004 | McCue | 370/464 |
| 2005/0220064 A1 | 10/2005 | Hundscheidt | |
| 2007/0047702 A1* | 3/2007 | Newell et al. | 379/101.01 |
| 2007/0192422 A1* | 8/2007 | Stark et al. | 709/206 |
| 2008/0125120 A1* | 5/2008 | Gallagher et al. | 455/435.2 |
| 2009/0119678 A1* | 5/2009 | Shih et al. | 719/313 |
| 2009/0156170 A1 | 6/2009 | Rossano | |

FOREIGN PATENT DOCUMENTS
WO    2008065253 A    6/2008

* cited by examiner

*Primary Examiner* — Khai M Nguyen
(74) *Attorney, Agent, or Firm* — Andrew Wilford

(57) ABSTRACT

The invention relates to a method and a system for transmitting an electronic short message via at least one telecommunication network (N) from a first terminal device (D) for telecommunication to a group of two or more receiving devices (A, B). The short message is received by a messaging center (C) and the latter sends this short message as single messages to the receiving devices (A, B). The single messages, after having been received, are marked as unread on the receiving devices (A, B). According to the invention an identifier identifying the short message is allocated to the single messages. One of the receiving devices (A, B), in the case of the single message being read, generates a read confirmation with the identifier and transmits it to the messaging center (C) which then transmits a status change message with the identifier to the other receiving devices (A, B). The status change message is allocated to the single message on the basis of the identifier on the respective receiving device (A, B) and the single message is marked as read on this receiving device (A, B).

14 Claims, 1 Drawing Sheet

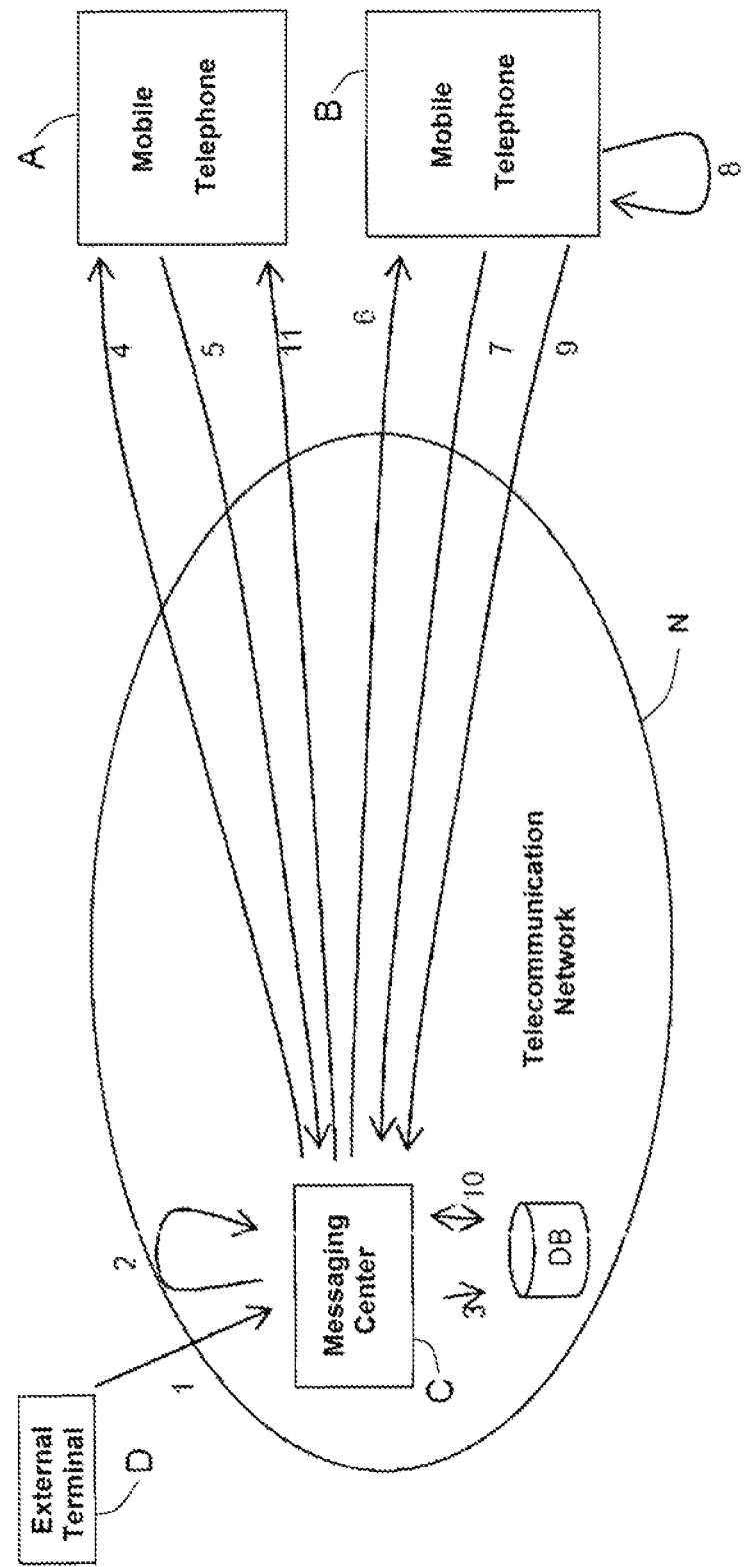

METHOD FOR TRANSMITTING AN ELECTRONIC SHORT MESSAGE TO MULTIPLE RECEIVERS

CROSS REFERENCE TO RELATED APPLICATIONS

This application is the US-national stage of PCT application PCT/EP2010/003765 filed 23 Jun. 2010, published 29 Dec. 2019 as WO2010/149348, and claiming the priority of German patent application 102009030219.0 itself filed 23 Jun. 2009.

FIELD OF THE INVENTION

The present invention relates to a method for transmitting an electronic short message via at least one telecommunication network from a first terminal device for telecommunication to a group of two or more receiving devices, wherein the short message is received by an messaging center and the latter sends this short message as single messages to the receiving devices, and the single messages, after having been received on the receiving devices, are marked as unread.

BACKGROUND OF THE INVENTION

Due to the saturation of the mobile radio market, it frequently occurs that mobile radio users have more than one mobile telephone. For example, mobile radio subscribers often use, in addition to a first mobile telephone with a SIM (subscriber identification module) card, which is also carried, a car telephone that is formed by a second mobile telephone that can be inserted into a corresponding holding device in the vehicle or that can already be integrated in the vehicle and becomes useable by inserting a SIM card. In general, a single unambiguous telephone number is allocated to a SIM card, however, so that the corresponding mobile radio subscriber, in the case of owning a number of SIM cards, also has a number of telephone numbers which is particularly disadvantageous for the mobile radio subscriber himself and the communication partners calling him since they must know a number of mobile radio telephone numbers.

To overcome this disadvantage, it is known to assign the same telephone number to multiple mobile telephones. This service is implemented in that this one telephone number allocated to a main device is routed to the telephone numbers of the other terminals so that, in the case where this number is called, all mobile telephones of the subscriber will ring if they are registered in the telecommunication network. As soon as the subscriber accepts the call on one of the mobile telephones, the ringing of the other mobile telephones is correspondingly ended. This service is particularly comfortable and user-friendly since the mobile radio subscriber now only needs to use one mobile radio telephone number and must only inform his communication partners of this number.

With respect to sending out electronic short messages, such as SMS (short messaging service) or MMS (multimedia messaging service), this service has disadvantages, however. As soon as a number of mobile telephones can be reached via a single telephone number, an electronic short message sent to this telephone number is conveyed to all mobile telephones. Since the read state of a short message is indicated in modern mobile telephones, i.e. the corresponding short message is marked as "read" or "unread", sending a short message to a number of mobile telephones has the consequence that the message can be marked as "read" on one of the mobile telephones and as "unread" on one or more other mobile telephones.

Furthermore, the case may occur that a mobile telephone is not registered in the network whilst another mobile telephone receives a short message and the subscriber reads the message on this device. As soon as the one mobile telephone is then registered in the network, the same short message is also supplied to it and marked as "unread" in the mobile telephone even though the message has already been read on another mobile telephone.

This leads to the mobile radio subscriber expending an increased amount of work in finding out which message is really "new" and which has already been read.

OBJECT OF THE INVENTION

It is the object of the present invention, therefore, to provide a method and a system for transmitting an electronic short message to a number of receiving devices that enables a synchronization of the status indication of the short messages on the receiving devices so that the user of the receiving devices can find out rapidly and in a simple manner which received short message has already been read and which has not.

SUMMARY OF THE INVENTION

According to the invention, a method for transmitting an electronic short message via at least one telecommunication network from a first terminal device for telecommunication to a group of two or more receiving devices is proposed, where the short message is received by a messaging center that sends the short message as single messages to the receiving devices, and the single messages, after having been received on the receiving devices, are marked as unread, an identifier identifying the short message being allocated to the single messages, one of the receiving devices, in the case of the single message being read, generating a read confirmation with the identifier and transmitting it to the messaging center that transmits a status change message with the identifier to the other receiving devices and the status change message being allocated to the single message on the basis of the identifier on the other receiving devices and the single message being marked as read on each of these other receiving devices.

The basic concept of the present invention lies in providing an electronic short message with an unambiguous identifier so that the latter can be identified at any time and in the various facilities of the telecommunication system used for the message transmission, particularly in the messaging center and the terminal devices.

According to the invention, the group of receiving devices belonging together that can be preferably mobile telephones but, as an alternative, can also be other terminals arranged for telecommunication such as car telephones, smart phones or also fixed network telephones, is characterized in that these receiving devices belong to one and the same telecommunication subscriber and can be called with one and the same telephone number. This can be achieved by the fact that on the network side, this one telephone number that is allocated permanently to a first receiving device (main device) is routed to other telephone numbers allocated to the other receiving devices (secondary devices).

If then a telecommunications subscriber sends a short message to this telephone number of the group, the message is first received in a messaging center that then forwards the short message in the form of single messages to the receiving devices of this group. According to the invention, an identifier identifying the short message is allocated to the single messages so that the short message can be referenced unambiguously in the telecommunication system. If the message is read on one of the receiving devices, this device sends a read confirmation to the messaging center that, according to the invention, is also provided with the identifier so that the messaging center can allocate the read confirmation to the previously sent short message by means of this identifier. It can then check to which other receiving devices the short message has previously been sent. After determining these receiving devices, the messaging center, according to the invention, sends a status change message to these other receiving devices that is also provided with the identifier so that an allocation of the status change message to the previously received single message is possible on the side of the other receiving devices and a previously received single message can be identified as read on the other receiving devices since it has already been read on the one receiving device.

This method according to the invention produces a synchronization of the status indication "read" or "unread" of the short messages on all the receiving devices of the group.

In one embodiment of the method according to the invention the messaging center can transmit the status change message with the identifier to the other receiving devices immediately after having received the read confirmation of any of the receiving devices of the group. This ensures that the status indication is always the same on every active device. However, in an alternative it can be provided that the messaging center transmits the status change message only after having received the read confirmation of a specific receiving device of the group, i.e. of a main device of the group, or in a further alternative after having received read confirmation of two or more or all receiving devices of the group.

Corresponding to the design of the receiving devices as mobile telephones, the telecommunication network can be a mobile radio network, for example a GSM (Global System for Mobile communications) or a UMTS (Universal Mobile Telecommunications System) network. However, since it is also possible today to send electronic short messages such as SMS from and to fixed network telephones and from a computer via the Internet to a mobile telephone or a landline telephone, the telecommunication network, as an alternative, or in combination with the mobile radio network, can also be arranged as a cable-connected telephone network or an IP (Internet Protocol)-capable network such as the Internet.

The identifier can be, for example, an alphanumeric sequence so that a simple storage, allocation to the short message and processing of the identifier on the individual facilities of the communication system is possible.

The identifier can preferably be stored in a database together with a list of the terminals belonging to the group at the network end. In this context, the database is connected to the messaging center. This makes it possible for the messaging center, after receiving a read confirmation from a receiving device with the identifier, to be able to find out which previously sent message has been read and to which terminals the short message has previously been sent. Correspondingly, the messaging center identifies, according to the present method, with the aid of the identifier contained in the read confirmation, the receiving devices that have received a single message and sends to these the status change message with the identifier. In this context, the list can contain the actual telephone numbers allocated to the receiving devices.

In one embodiment, the status change message can be sent to all receiving devices. This also includes the receiving device on which the short message has been read. Since the short message is already marked as "read" on this receiving device, it is not absolutely necessary to send the status change message also to this receiving device, however. It can therefore also be provided that the read confirmation contains the actual telephone number of the receiving device on which the message has been read so that the messaging center can check to which terminal of the group of receiving devices no status change message needs to be conveyed. It is then not necessary to send a status change message to this terminal.

The identifier can be preferably generated by the messaging center itself and appended appropriately to the single messages. As an alternative, it can also be provided that the terminal device sending the short message generates the identifier and itself appends it to the short message, the messaging center only conveying identical copies as single messages to the respective receiving devices in this case.

In principle, the method according to the invention can be used with any transmission of electronic short messages, where, apart from the standard case where a first terminal device sends a short message to a single second terminal device, the messaging center generates an identifier identifying the short message when the short message is to be sent to two or more terminal devices. This means that the messaging center initially checks how many receiving devices are addressed or determined by routing specifications for the short message, and that the method according to the invention is carried out only if the messaging center finds that two or more terminals are or are intended to be receivers of the short message.

If a receiving device is not connected to the telecommunication network at the time of reading a received short message on another receiving device, i.e. in the case of a mobile radio network, is not registered in it, the single message, in the case of a registration of this receiving device in the telecommunication network after the reading of the single message on the other receiving device, can be sent together with the status change message to the receiving device just registered, i.e. immediately after registration. Thus, this now active receiving device, too, is synchronized with the read state of the message on the other receiving devices immediately after its switch-on.

BRIEF DESCRIPTION OF THE DRAWING

Further features and advantages of the invention will be explained in greater detail by means of an actual illustrative embodiment and the attached single FIGURE referred to in the text that follows.

DETAILED DESCRIPTION OF THE INVENTION

The FIGURE shows a diagrammatic representation of the telecommunication system according to the invention, the arrows marking the transmission of data including the direction of transmission.

In the field of mobile telecommunication, it is known to replace different telephone numbers allocated to different terminals by a common telephone number that is routed to the individual terminals of the user. From the point of view of the communication subscriber, the latter therefore only has a single telephone number by means of which he can be contacted. The communication subscriber can initiate a call from any of the mobile telephones and incoming calls are indicated to him at each of the mobile telephones. As soon as the mobile subscriber accepts the call at one of the mobile telephones, call signaling ends at the other mobile telephones.

The transmission of electronic short messages to multiple mobile telephones is more complicated compared with the treatment of voice calls. Either the short message is transmitted to all mobile telephones or only to a single device. The latter has the disadvantage that there is a risk that the message is transmitted to the terminal that the communication subscriber is currently not carrying with him. On the other hand, the electronic short message could be transmitted to a mobile telephone on which the communication subscriber does not wish to have it. Instead, he prefers a different mobile telephone on which the message is to be stored. On the other hand, the transmission of the short message to all terminals results in the following disadvantages:

A read short message and message marked as "read" in one mobile telephone is not represented as "read" in the other mobile telephones. The terminal user must correspondingly always remember or check which short message is actually new or which he has already read but is represented as "unread".

Furthermore, there is the disadvantage with terminals that are switched off or those that are not registered in the telecommunication network because they are either out of range or located in a dead spot and receive a short message during this time, that the message can already be outdated at the time when it is received because it has been read on another terminal. The short messages are either transmitted to the mobile telephone and the subscriber receives many "new" short messages that, however, he has already read previously, or the "new" short messages are not transmitted to the mobile telephone that then leads to the disadvantage that not all short messages are stored in the mobile telephone. Similar problems exist in the case of mobile telephones in which the memory provided for the reception of messages is full so that they can no longer receive any short messages. Here, too, the question is how new short messages are to be handled if they have already been read on another terminal before they have been provided on the terminal, and are thus factually outdated.

According to the invention, an existing telecommunication system for transmitting electronic short messages is expanded by new mechanisms that carry out a synchronization of the status representation of short messages on a group of receiving devices that is characterized by a common telephone number.

According to the invention, the short message service is expanded by the fact that an identifying identifier is added to a short message and is transmitted together with the short message to the receiving devices. The identifier is an unambiguous reference that is transmitted with all single messages from the mobile radio operator to the mobile receiving devices. The short message identifier is stored in the mobile receiving devices together with the short message initially declared as "new". The short message identifier is used for informing the mobile radio operator whether an "unread" short message has been read. Furthermore, the short message identifier is used by the mobile radio operator to reference a specific short message, wherein the operator can find out to which mobile radio receiving devices the message has previously been sent.

The identifier is stored together with the short message in a database as soon as the short message is sent to multiple receiving devices. In this context, it is not only the short message identifier itself but additionally also a list of all receiving devices that have received a copy of the electronic short message that is stored.

The mobile telephones send a read confirmation to the network operator in order to inform the latter that a short message that can be specified by the identifier has been read.

The messaging center operated by the mobile radio network operator is set up to receive the read confirmation from one of the mobile receiving devices and to identify the remaining receiving devices with the identifier obtained with this read confirmation.

Furthermore, the messaging center is set up to send a read confirmation to the receiving devices. This read confirmation represents a status change message since it informs the terminal or terminals via the short message identifier that the short message that can be identified by means of the identifier has already been read on another receiving device. The status change message therefore causes the other receiving devices also to mark the short message as "read".

To carry this out, the receiving devices are set up for receiving the read confirmation or the status change message, respectively, sent out by the messaging center and to use the identifier transmitted with this confirmation or message. The receiving devices are correspondingly set up for extracting the identifier from the message and identifying the previously received short message to which the identifier is allocated and for marking the latter now as "read".

The behavior of the telecommunication system according to the invention is represented in the text that follows:

The FIGURE shows the facilities necessary for carrying out the method and their interaction for transmitting and receiving an electronic short message at multiple receiving devices, i.e. a group of two or more receiving devices such as mobile telephones. In this context, the elements "A" and "B" identify mobile telephones. Element "C" identifies an messaging center that is integrated in the telecommunication network "N" of a mobile radio operator for processing short messages. The messaging center carries out not only a short message service according to the international standard but, instead, such a short message transmission service that, according to the present invention, is correspondingly expanded in order to carry out the transmission of an electronic short message to two or more receiving devices.

The element D is an external terminal that sends a new electronic short message to the messaging center so that the latter forward copies of the message, i.e. single messages to the group of receiving devices. A special case exists if the element D is located within the telecommunication network N of the owner of the receiving devices A, B. This is the case when a terminal, i.e. neither A nor B, is the sender of the new short message and this terminal is located within the same mobile radio network N as A and B. This case is not shown in the FIGURE but does not change the information flow since terminal D within the communication network N, when receiving a new short message, would forward the latter to the messaging center C.

A database DB is connected to the messaging center C so that the latter can store identifiers of short messages and lists of the mobile telephones to which the corresponding short messages are sent.

In the text that follows, the method will be explained with reference to the arrows provided with numbers in the FIGURE.

In a first step 1, a new short message coming from the first terminal D is received by the messaging center C. This new short message is addressed to a user who has a number of mobile telephones A, B. In a second step 2, the messaging center C identifies that the new short message is directed to a user having a number of receiving devices. It thereupon generates an identifier that identifies the short message and stores it in the database DB together with a list of the group of associated receiving devices A, B, see step 3.

Following this, the messaging center C sends out the new short message or, respectively, a copy of it as single message together with the short message identifier to the mobile radio device A of the group, see step 4. The mobile radio device A correspondingly informs the user that a new short message has been received and indicates it as "unread". In step 5, the first receiving device A confirms the reception of the new short message by means of read confirmation that is sent to the messaging center C. At the same time as step 4 or following step 5, the messaging center furthermore sends out a single message with an identifier identifying the original short message to the second receiving device B of the group, see step 6. This, too, informs the user of the receiving device B correspondingly about the reception of a new SMS and indicates it as "unread". According to step 7, this receiving device B, too, confirms the reception of the SMS by sending a read confirmation to the messaging center C.

By way of example, the telecommunication subscriber recognizes on the second receiving device B of the group that there is an "unread" message, i.e. a new short message has been received. He opens this message in order to read it, which changes the state of the "unread" message to a "read" short message, see step 8. This new state is then correspondingly indicated on the receiving device B.

In the steps and the subsequent ones, the first receiving device A and the second receiving device B of the group can be exchanged for one another in each case without deviating from the method steps according to the invention and the basic concept of the invention.

In step 9, the second receiving device B now sends a read confirmation to the messaging center C and informs the latter that the new short message, which is identifiable via the identifier, has been read. The messaging center subsequently checks whether the identifier is contained in the database DB. It thus checks to which receiving devices the original short message or the single messages, respectively, have been transmitted. This can be done in a simple manner in that the corresponding actual telephone numbers of the receiving devices are stored in the database correlated with the identifier. Once the identifier has been found in the database, the data specifying the receiving devices, especially their associated telephone numbers, are loaded so that the messaging center can selectively address these receiving devices, see step 10.

In a last step 11, the messaging center C transmits a status change message with the identifier to the second receiving device A of the group. With this status change information, the second receiving device A is informed that the previously transmitted short message with the specified identifier has been read. The status change message causes the second receiving device A also to represent this message as "read".

In the case where the second receiving device A of the group is switched off or is located outside the receiving range of the telecommunication network N so that the messaging center C cannot carry out the steps 4 and 5 previously described, the method according to the invention can be developed further or altered by the following steps:

If the second receiving device A registers in the mobile radio network N before the short message is read (step 8), steps 4 and 5 are carried out after steps 6 and 7 previously represented, but before step 8. In this case, the new short message is transmitted to both receiving devices A and B and the information flow is continued with steps 9 to 11. If, in contrast, the second receiving device A, as an alternative, registers in the mobile radio network M only after the user has read the message on the other receiving device B (step 8), the steps 9 and 10 previously explained are carried out before the registration of the second receiving device A in the mobile radio network. As soon as the second receiving device A then registers, the messaging center C forward the new short message, according to step 4, to the second receiving device A that subsequently sends back a corresponding reception confirmation to the messaging center C, steps 4 and 5. Following this, the status change message together with the identifier is directly transmitted to the second receiving device A in order to inform the latter that the new SMS is to be marked as "read", step 11.

The method explained thus describes a simple and reliable possibility of carrying out a synchronization of the indication of read states of a short message on a number of receiving devices.

The invention claimed is:

1. In a method of transmitting an electronic short message via at least one telecommunication network from a first terminal device for telecommunication to a group of receivers where the short message is received by a messaging center that sends this short message as single message to the all of the receivers of the group that are registered on the network, and the single messages, after having been received, are marked as unread on the receivers of the group that are registered on the network, the improvement comprising the steps of:
    allocating an identifier identifying the short message to each single message,
    generating with one of the receivers, in the case of the single message being read, read confirmation with the identifier and transmitting it to the messaging center,
    thereafter transmitting via or by messaging center a status change message with the identifier to the other receivers of the group that are registered on the network,
    allocating the status change message to the single message on the basis of the identifier on the other receivers,
    marking the single message as read on the other receivers, and
    when there is registration of one of the receivers of the group into the telecommunication network after the single message has been read on another receiver, transmitting the single message and the status change message immediately after the registration to the one receiver registering on the network.

2. The method according to claim 1, wherein the identifier is stored in a database together with a list of the receivers belonging to the group.

3. The method according to claim 1, wherein the messaging center identifies, with the aid of the identifier contained in the read confirmation, the receivers that have received a single message.

4. The method according to claim 1, wherein the messaging center identifies the other receivers with the aid of a telephone number of the receiver having sent the read confirmation, the telephone number being contained in the read confirmation.

5. The method according to claim 1, wherein all receivers of the group is allocated the same telephone number.

6. The method according to claim 1, wherein the identifier is generated by the messaging center.

7. The method according to claim 1, wherein the identifier is only generated when the short message is to be sent to two or more receivers.

8. The method according to claim 1, wherein a reception confirmation is transmitted to the messaging center by the receivers after having received the single message.

9. A system for transmitting an electronic short message via at least one telecommunication network from a first terminal device for telecommunication to a group of two or more receivers, wherein
    the short message is received by a messaging center that sends the short message as single message to the receivers of the group that are registered in the network,
    the single message, after having been received on the receivers can be marked as unread,
    the system allocates to the single message an identifier identifying the short message,
    the receivers generate and transmit to the messaging center a read confirmation with the identifier in the case of the single message being read,
    the messaging center transmits a status change message with the identifier to the other receivers of the group that are registered in the network,
    the receivers also allocate the status change message on the respective receiver to the single message on the basis of the identifier and mark the single message as read, and
    the messaging center, when there is registration of one of the receivers in the group into the network after the single message has been read on another receiver, transmits the single message and the status change message immediately after such registration to the newly registered receiver.

10. The system according to claim 9, wherein the devices are mobile telephones.

11. The system according to claim 9, wherein the telecommunication network is a mobile radio network.

12. The system according to claim 9, wherein the short message is an SMS or MMS.

13. The system according to claim 9, wherein the identifier is an alphanumeric sequence.

14. The system according to claim 9, wherein the messaging center is set up for generating the identifier and allocating it to the single messages.

* * * * *